United States Patent [19]
Sugiyama et al.

[11] Patent Number: 5,805,078
[45] Date of Patent: Sep. 8, 1998

[54] MOBILE COMMUNICATIONS NETWORK AND MOBILE COMMUNICATION METHOD

[75] Inventors: Kazuo Sugiyama, Kashiwa; Shoichi Hirata, Higashiyamato; Yasushi Nakamura, Huchu, all of Japan

[73] Assignee: NTT Mobile Communications Network, Inc., Japan

[21] Appl. No.: 662,025

[22] Filed: Jun. 12, 1996

[30] Foreign Application Priority Data

Jun. 12, 1995 [JP] Japan .................................. 7-145020

[51] Int. Cl.$^6$ ........................................................ H04Q 7/00
[52] U.S. Cl. .................... 340/825.52; 455/445; 455/433; 455/551; 455/349; 370/310; 370/311; 370/313; 379/185
[58] Field of Search .................. 340/825.52; 379/185; 455/445, 433, 328, 349, 475, 524, 525, 551, 432, 550, 561, 456; 370/310, 313

[56] References Cited

U.S. PATENT DOCUMENTS

| | | | |
|---|---|---|---|
| 4,833,701 | 5/1989 | Comroe et al. | 455/432 |
| 5,058,201 | 10/1991 | Ishii et al. | 455/456 |
| 5,210,787 | 5/1993 | Hayes et al. | 455/432 |

*Primary Examiner*—Michael Horabik
*Assistant Examiner*—Yves Dalencourt
*Attorney, Agent, or Firm*—John T. Johnson

[57] ABSTRACT

A mobile communications network and a mobile communication method for reducing loads to be incurred to the mobile communications network which loads occur because the user changes its mobile communication terminal. Mobile communication terminal numbers of mobile communication terminals (21), (22), IDs of users (31), (32) of the mobile communication terminals, and at least one address to be used by each user when the user performs a communication. The mobile communications network comprises an address/user corresponding table (13) having a table for bringing addresses to be used in each of the multiple communication methods and a user ID into corresponding relation. When a terminating request specifying an address is made, a user ID corresponding to the specified address is obtained using the address/user corresponding table. Further, a mobile communication terminal number is retrieved using a user/mobile communication terminal corresponding table (14) for bringing the user ID and the mobile communication terminal number into a corresponding relation, then a mobile location area of the mobile communication terminal corresponding to the user ID is read, and the incoming signal is terminated in the mobile communication terminal using the mobile communication terminal number and the mobile location area.

5 Claims, 9 Drawing Sheets

FIG. 2

ADDRESS/USER CORRESPONDING TABLE 11

FIG. 3

USER/MOBILE COMMUNICATION TERMINAL CORRESPONDING TABLE 41

FIG. 6

ADDRESS/USER CORRESPONDING TABLE 12

FIG. 9

ADDRESS/USER CORRESPONDING TABLE 13

MOBILE COMMUNICATIONS NETWORK AND MOBILE COMMUNICATION METHOD

BACKGROUND OF THE INVENTION

This invention relates to a mobile communications network having user IDs for identifying users, and mobile communication terminal numbers for identifying mobile communication terminals, and a mobile communication method capable of selecting a proper terminating end in the mobile communications network.

A typical conventional mobile communications network includes address/mobile communication terminal corresponding means for bringing an address of a terminating end to be used in each communication method into a corresponding relation to a mobile communication terminal number of the terminating end. Heretofore, the mobile communication terminal number of the terminating end was obtained by the address/mobile communication terminal corresponding means and an incoming signal or data item was terminated in a mobile communication terminal which has the number thus obtained.

Recently, with the progress of an information-oriented society, a multimedia communication has been demanded in which multiple communication methods are realized by a single mobile communication terminal. However, if a mobile communication terminal number is conventionally brought into a corresponding relation with addresses to be used in various communication methods, it becomes necessary to correct the address/mobile communication terminal corresponding means with respect to the addresses to be used in the various communication methods when a user changes the current mobile communication terminal to another.

Even in case a communication is performed through a single communication method, when the user uses a plurality of addresses, the means for bringing the addresses respectively to the mobile communication terminal numbers are all required to be changed.

For this reason, as the frequency of change of the mobile communication terminal made by the user is increased, an amount of correction required is increased within the communications network and loads to be incurred to the mobile communications network is increased, too.

SUMMARY OF THE INVENTION

It is, therefore, an object of the present invention to provide, in order to obviate the above problems, a mobile communications network and a mobile communication method capable of preventing increase of an amount of correction required at a terminating end within a mobile communications network even if the multimedia communication is further spread.

To achieve the above object, according to the invention, there is provided a mobile communications network for performing a communication using a mobile communication terminal number assigned to each mobile communication terminal and a user ID assigned to a user of the mobile communication terminal, comprising address/user corresponding means for bringing an address, which the user uses for performing a communication through the communications network and the user ID into a corresponding relation; user/mobile communication terminal corresponding means for bringing the user ID and the mobile communication terminal number into a corresponding relation; first communication means for storing a mobile location area of each mobile communication terminal; means for obtaining a user ID corresponding to a specified address when a terminating request specifying an address is made using the address/user corresponding means; retrieval means for retrieving a mobile communication terminal number corresponding to the user ID using the user/mobile communication terminal corresponding means; read means for reading a mobile location area of a mobile communication terminal specified by the retrieved mobile communication terminal number from the first storage means; and termination means for terminating in the specified mobile communication terminal using the retrieved mobile communication terminal number and the mobile location area thus read.

According to the invention, there is provided a mobile communications network, wherein the address/user corresponding means includes means for bringing a plurality of addresses and a user ID into multiple-to-one corresponding relation.

According to the invention, there is provided a mobile communications network, wherein the communications network has a multiple communication methods, and the address/user corresponding means includes means for bringing addresses used in each of the multiple communication methods and a user ID into multiple-to-one corresponding relation.

According to the invention, there is provided a mobile communications network further comprising second storage means for writing the mobile communication terminal number retrieved using the user/mobile communication terminal corresponding means and the mobile location area read from the first storage means in such a manner as to correspond to the specified address when a terminating request specifying a certain address is made for the first time, when a terminating request specifying the same address again, the terminating means reading the mobile communication terminal number corresponding to the specified address and the mobile location area from the second storage means and terminating the incoming signal in the specified mobile communication terminal.

According to the invention, there is provided a mobile communication method in a communications network in which a mobile communication terminal number is assigned to each mobile communication terminal, a user ID is assigned to a user of the mobile communication terminal, and at least one address is preliminarily determined which address is used when the user performs a communication in the communications network, and in which the addresses to be used in each of multiple communication methods and the user ID are preliminarily stored in an address/user corresponding means in multiple-to-one corresponding relation, and the user ID and the mobile communication terminal number are preliminarily stored in user mobile communication terminal corresponding means, and when a terminating request is made specifying the address, the mobile communication method comprising the steps of obtaining the user ID corresponding to the specified address using the address/user corresponding means; retrieving a mobile communication terminal number corresponding to the obtained user ID using the user/mobile communication terminal corresponding means; reading a mobile location of the mobile communication terminal corresponding to the user ID from storage means for storing mobile location areas of various mobile communication terminals; and terminating the incoming signal in the specified mobile communication terminal using the retrieved mobile communication terminal number and the read-out mobile zone area.

According to the mobile communications network and the mobile communication method thus constructed, a single user is specified by the address/user corresponding means. The user/mobile communication terminal corresponding means brings the single user into a corresponding relation with a mobile communication terminal at the terminating end. Accordingly, the terminating ends of all addresses of the user are changed by changing a mobile communication terminal corresponding to a certain user within the user/mobile communication terminal corresponding means.

For this reason, even if the user changes the current mobile communication terminal to another, it is unnecessary to correct the address/mobile communication terminal corresponding means with respect to the addresses to be used in each communication method, and thus, loads to be incurred to the mobile communications network are reduced.

DETAILED DESCRIPTION OF THE EMBODIMENTS

Several embodiments of the present invention will now be described with reference to the accompanying drawings.
(First Embodiment)

Figure 1:
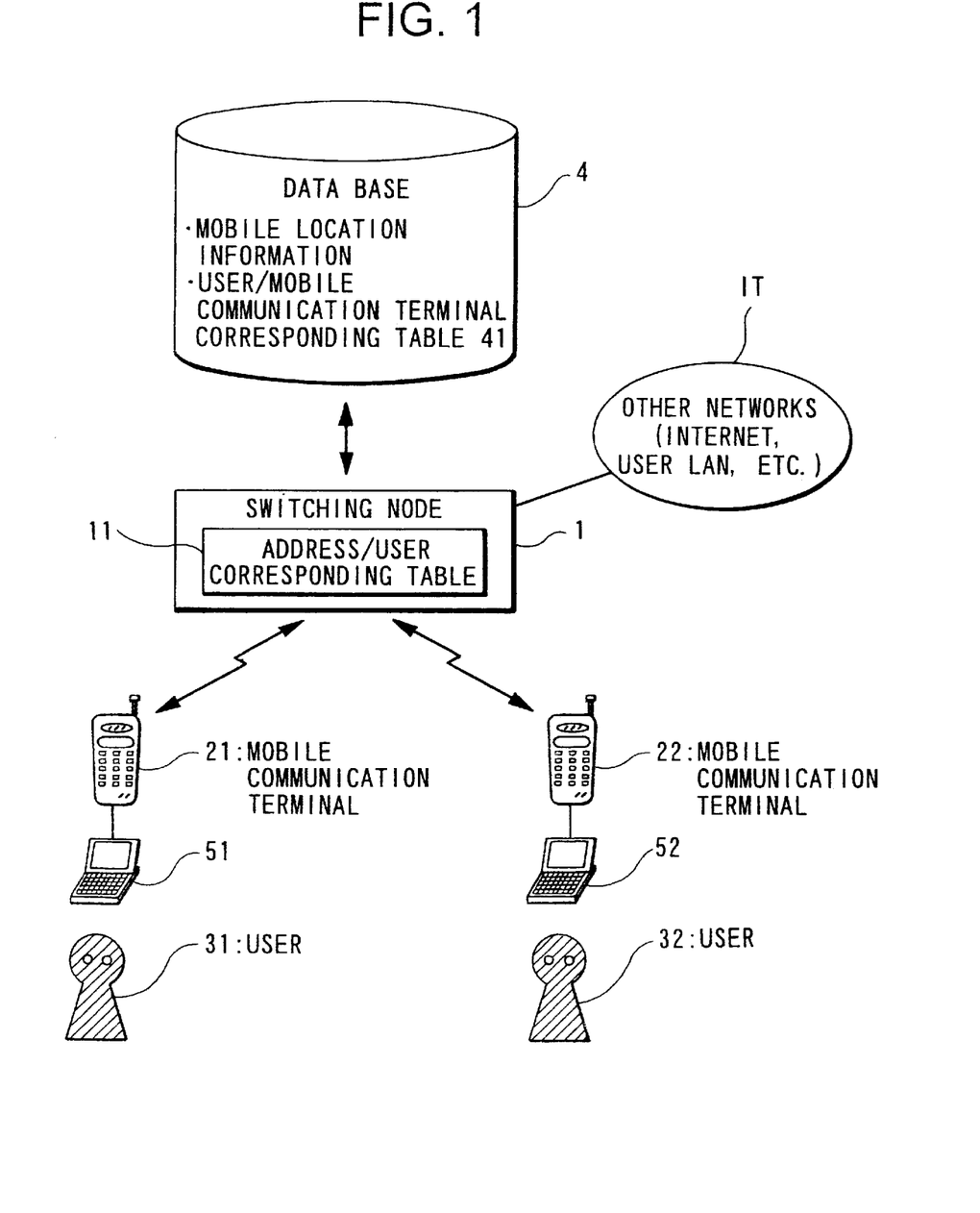
FIG. 1 is a block diagram showing a construction of a mobile communication system according to the first embodiment of the present invention.

In the first embodiment, the present invention is applied to a mobile communications network. FIG. 1 shows a block diagram showing a construction of a communication system according to the first embodiment.

In this illustration, reference numeral 1 denotes a switching node. This switching node 1 has an address/user corresponding table as later described. The switching node 1 performs various communications with other networks IT and other switching nodes (not shown). Another important task of the switching node 1 is to deliver various types of data to and from a data base 4 through communication lines, etc. The phrase other networks IT herein used refers to Internet, User LAN and the like.

The data base 4 manages mobile location information. This mobile location information indicates that such and such mobile communication terminal is currently located in such and such area which is under the supervision of such and such switching node. The data base 4 has a user/mobile communication terminal corresponding table 41 as later described. It should be noted that although the data base employed in this embodiment is of the type called one-way management method in which a data base is concentrically installed, it may be of another type called distributed management method in which one data base is divided into plural data bases so that such severally divided data bases are scatteringly distributed. The data base 4 of this embodiment may be located in any suitable place as far as it can be accessed by any switching node.

Reference numeral 21 and 22 denote mobile communication terminals, respectively. Each mobile communication terminal 21, 22 has its own mobile communication terminal number and can perform a data communication. Reference numeral 31 and 32 denote users, respectively. The users are assigned with their own identification numbers (user ID), respectively. Reference numeral 51 and 52 denote data terminals, respectively. The data terminals 51 and 52 are connected to the mobile communication terminals 21 and 22, respectively and can perform a data communication through one communication method. For this purpose, each of the data terminals 51 and 52 has its own address.

As discussed, FIG. 1 schematically depicts a state that the users 31 and 32 are engaged in data communication, utilizing the data terminals 51 and 52, respectively.

Figure 2:
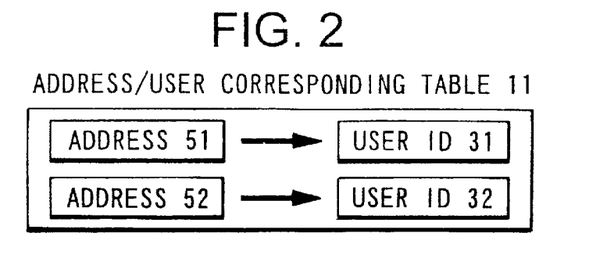
FIG. 2 is a block diagram showing a functional construction of an address/user corresponding table 11 usable in the above embodiment.

FIG. 2 shows a functional construction of the address/user corresponding table 11 which the switching node 1 has. The address/user corresponding table 11 is constituted of a hard disk drive unit (HDD), etc. and stores therein information showing a corresponding relation between each address and each user. When a certain address is input, the address/user corresponding table 11 retrieves the ID of the user using that address and then outputs the user ID thus retrieved.

Figure 3:
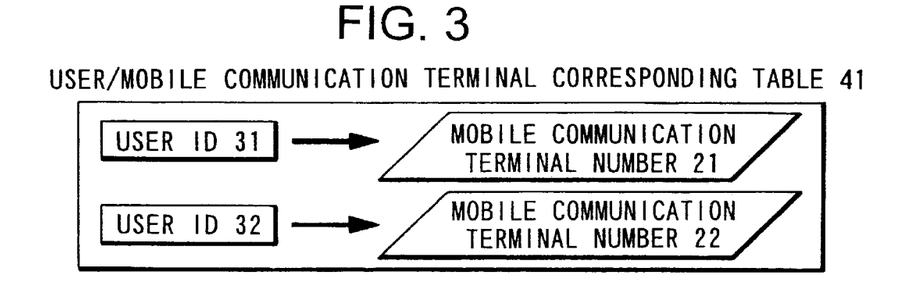
FIG. 3 is a block diagram showing a functional construction of a user/mobile communication terminal corresponding table usable in the embodiment of FIG. 1.

FIG. 3 shows a functional construction of a user/mobile communication terminal corresponding table 41 which the data base 4 has. The data base 4 is constituted of an HDD, etc. Among other things which the data base 4 has, the user/mobile communication terminal corresponding table 41 manages information showing a corresponding relation between each user and each mobile communication terminal. When a certain user ID is input, the user/mobile communication terminal corresponding table 41 retrieves the number of a mobile communication terminal of a user identified from the user ID and outputs the mobile communication terminal number thus retrieved.

Figure 4:
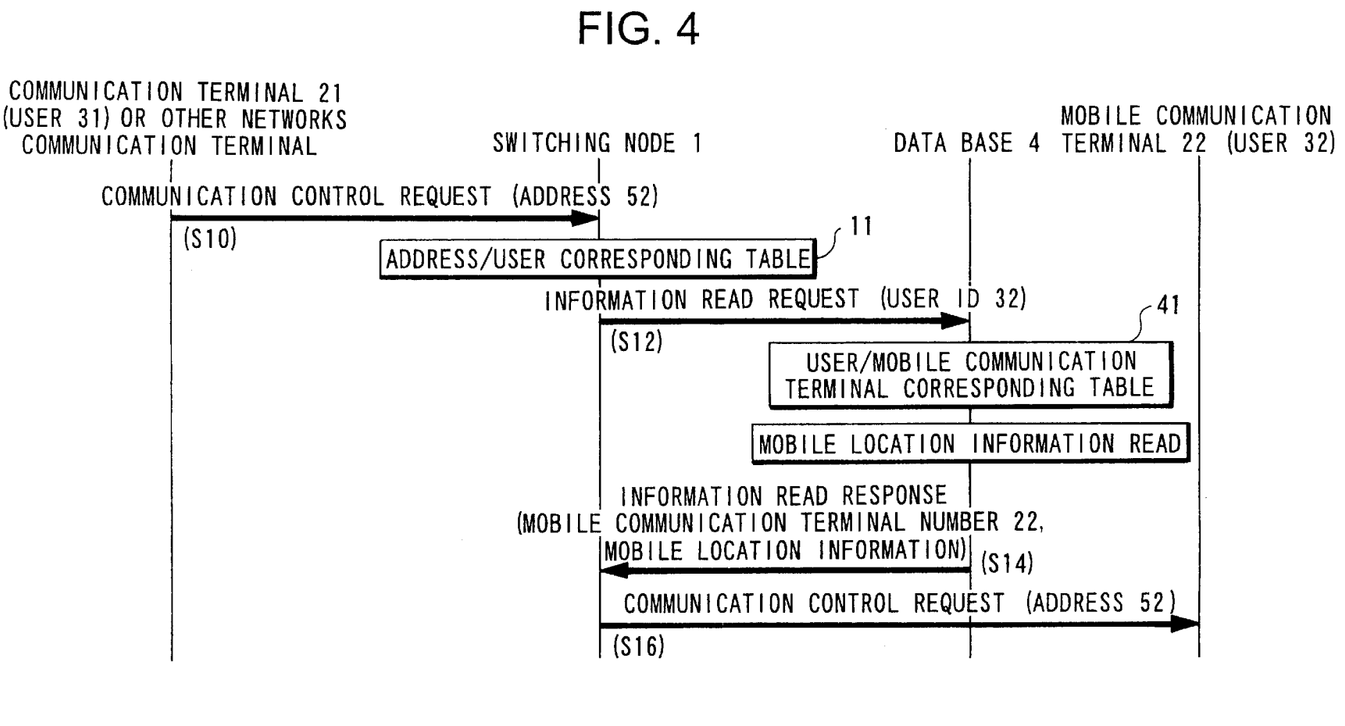
FIG. 4 is a sequence diagram showing a control sequence of the mobile communication system according to the embodiment of FIG. 1.

Operation of the communication system according to this embodiment will now be described. FIG. 4 is a diagram showing a sequence of such communication control procedures. The sequence diagram of FIG. 4 is based on the construction shown in FIG. 1. In this example, a communication request is made with respect to a data terminal 52 connected to the mobile communication terminal 22, that is, a packet data item addressed to the data terminal 52 is terminated. In this case, since the mobile location of the mobile communication terminal 22 is within an area which is under the supervision of the switching node 1 as shown in FIG. 1, the mobile location information of the mobile communication terminal 22 in the data base 4 shows this fact. Further, in the mobile communication, it is customary that various data items are transmitted in the form of a packet. Therefore, the data items addressed to the data terminal 52 are packeted and transmitted one after another.

First, the mobile communication terminal 21 or one of the terminals in other networks, as a requesting end, sends a first packet specifying an address of the data terminal 52 as the other party of the communication and makes a communication control request with respect to the switching node 1 (S10).

Upon receipt of such a communication control request as just mentioned, the switching node 1 obtains a user ID from the address contained in the communication control request using the address/user corresponding table 11. The switching node 1, which obtained the user ID, sends an information read request of a mobile communication terminal number to the data base 4 (S12).

Upon receipt of the information read request, the data base 4 obtains the mobile communication terminal number based on the user ID contained in the information read request using the user/mobile communication terminal corresponding table 41. Then, the data base 4 reads a mobile location information of the mobile communication terminal indicated by the mobile communication terminal number and transmits an information read response containing the mobile communication terminal number and the mobile location information to the switching node 1 (S14).

Upon receipt of the information read response, the switching node 1 performs a terminating control with respect to the mobile communication terminal 22 located in the area indicated by the mobile location information contained in the information read response and indicated by the mobile communication terminal number contained in the information read response (S16).

According to this first embodiment, even if the user changes the current mobile communication terminal to another, the terminating end can be changed merely by rewriting the user/mobile communication terminal corresponding table 41.

(Second Embodiment)

Figure 5:
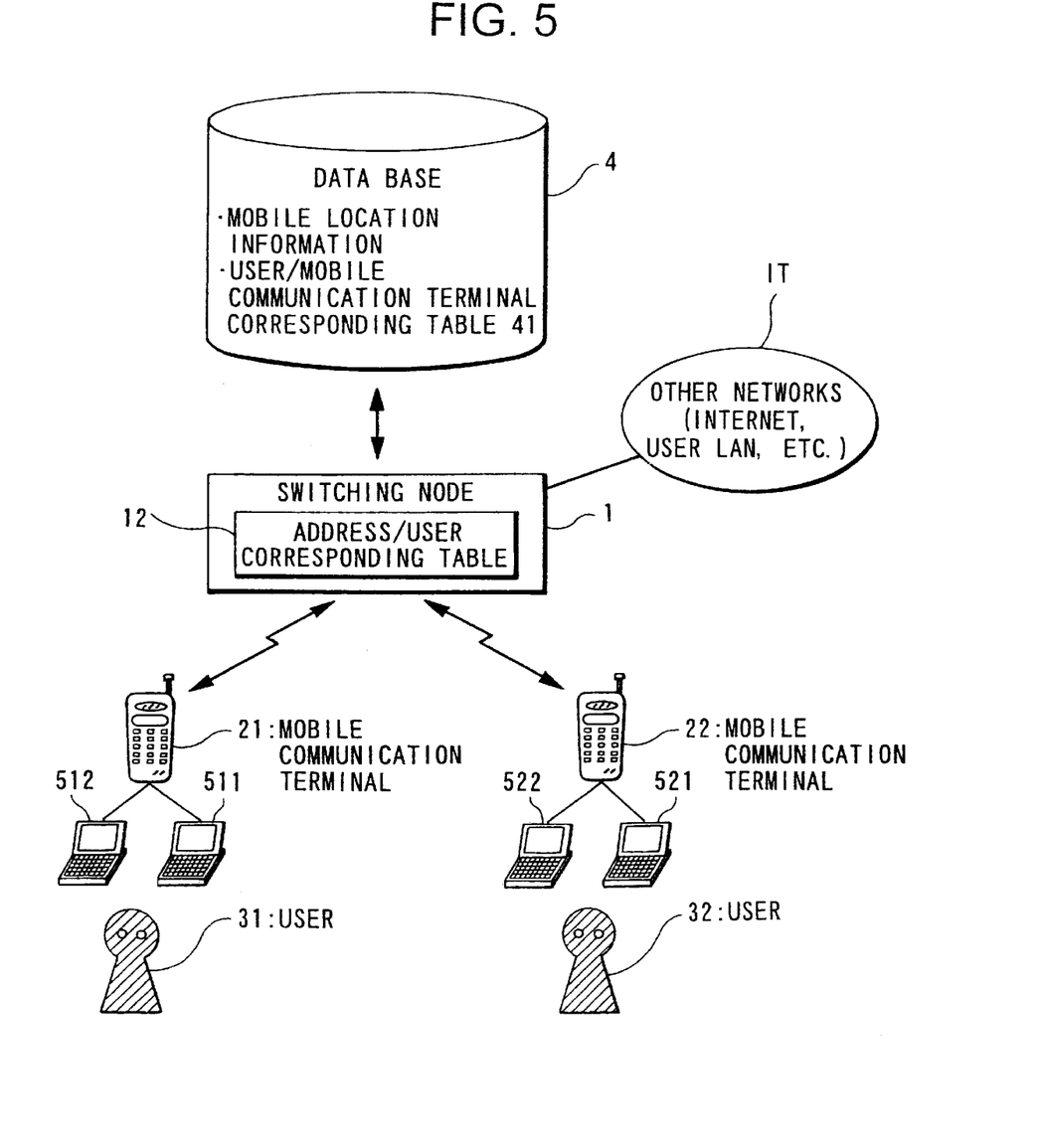
FIG. 5 is a block diagram showing a construction of a mobile communication system according to a second embodiment of the present invention.

The second embodiment, in which the present invention is applied to a mobile communications network, will now be described. FIG. 5 is a block diagram showing a construction of a communication system according to this second embodiment. In FIG. 5, corresponding parts to those of the construction of FIG. 1 are denoted by identical reference numeral and description of those parts is, therefore, omitted.

In FIG. 5, reference numeral 511, 512, 521 and 522 denote data terminals for performing a data communication through the same communication method. The data terminals 511, 512, 521 and 522 have their own addresses. For performing a data communication, the data terminals 511, 512, 521 and 522 are connected to the mobile communication terminals 21 and 22, respectively.

As discussed, FIG. 5 shows a state that the user 31 performs a data communication using the mobile communication terminal 21 and the data terminal 511 or 512, and that the other user 32 performs a data communication using the mobile communication terminal 22 and the data terminal 521 or 522.

Figure 6:
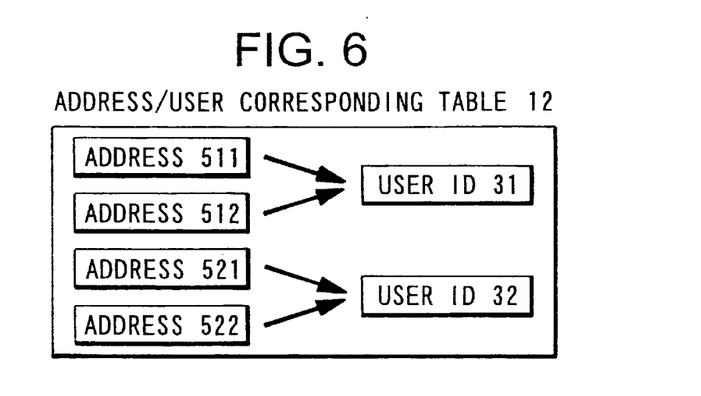
FIG. 6 is a block diagram showing a functional construction of an address/user corresponding table usable in the embodiment of FIG. 5.

The switching node 1 has an address/user corresponding table 12, as shown in FIG. 6, in the place of the address/user corresponding table 11 in the first embodiment. The address/user corresponding table 12 is different from the address/user corresponding table 11 in the respect that one or a plurality of addresses are brought into a corresponding relation with a single user ID.

Figure 7:
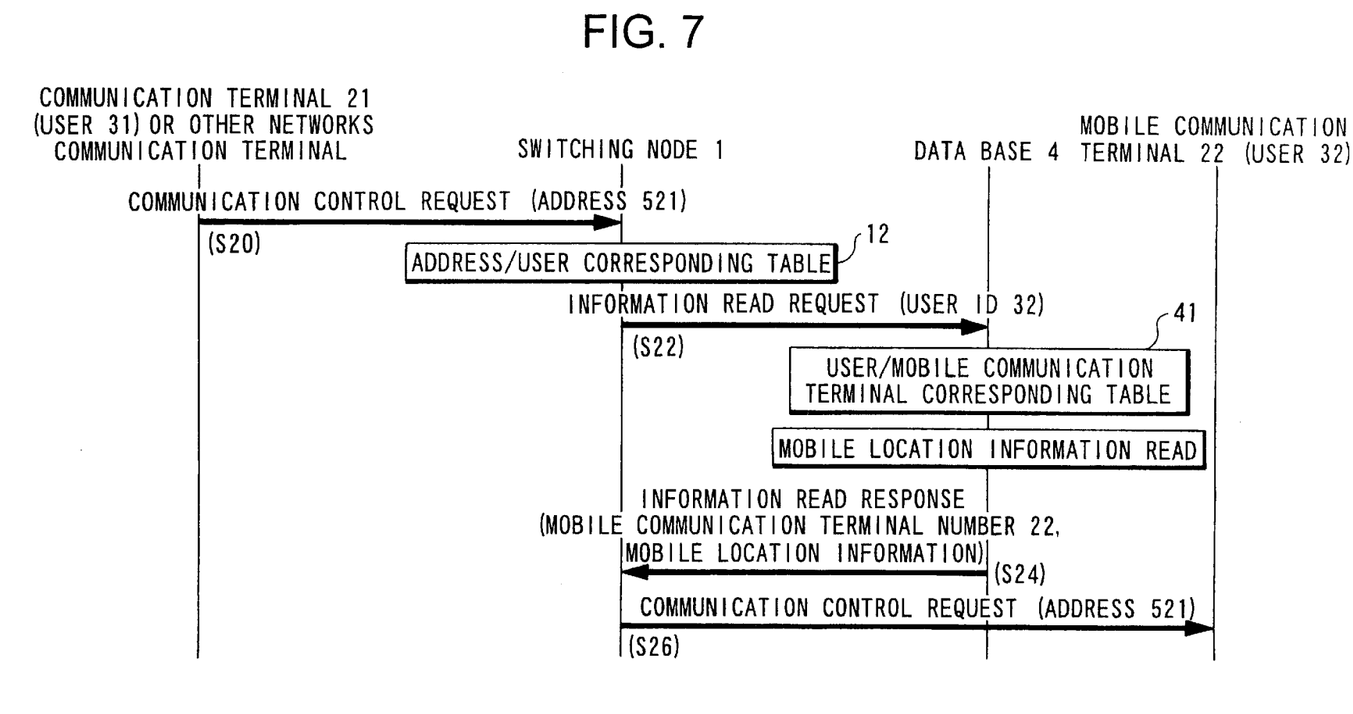
FIG. 7 is a sequence diagram showing a control sequence of the mobile communication system according to the embodiment of FIG. 5.

Operation of the communication system in this second embodiment will now be described. FIG. 7

FIG. 7 is a diagram showing a sequence of such communication control procedures. The sequence diagram of FIG. 4 is based on the construction shown in FIG. 1. In this example, an incoming data item is terminated in a data terminal 521 connected to the mobile communication terminal 22. In this case, the mobile communication terminal 21 or one of the terminals in other networks, as a requesting end, sends a communication control request to the switching node 1 using the address of the data terminal 521 which is assigned to the user 32 as the other party of the communication (S20).

Upon receipt of such a communication control request as just mentioned, the switching node 1 obtains a user ID from the address contained in the communication control request using the address/user corresponding table 12. The switching node 1, which obtained the user ID, sends an information read request containing the user ID to the data base 4 (S22).

Upon receipt of the information read request, the data base 4 obtains the mobile communication terminal number based on the user ID contained in the information read request using the user/mobile communication terminal corresponding table 41. Then, the data base 4 reads a mobile location information of the mobile communication terminal identified by the mobile communication terminal number and transmits an information read response containing the mobile communication terminal number and the mobile location information to the switching node 1 (S24).

Upon receipt of the information read response, the switching node 1 performs a terminating control with respect to the mobile communication terminal 22 located in the area indicated by the mobile location information contained in the information read response and indicated by the mobile communication terminal number contained in the information read response (S26).

According to this second embodiment, even if a single user has a plurality of data terminals, a single user ID is preliminarily retrieved from the addresses of the data terminals. Accordingly, even if the user changes the current mobile communication terminal to another, a call to any data terminal can be terminated in the newly changed mobile communication terminal merely by changing the corresponding part in the user/mobile communication terminal corresponding table 41.

(Third Embodiment)

Figure 8:
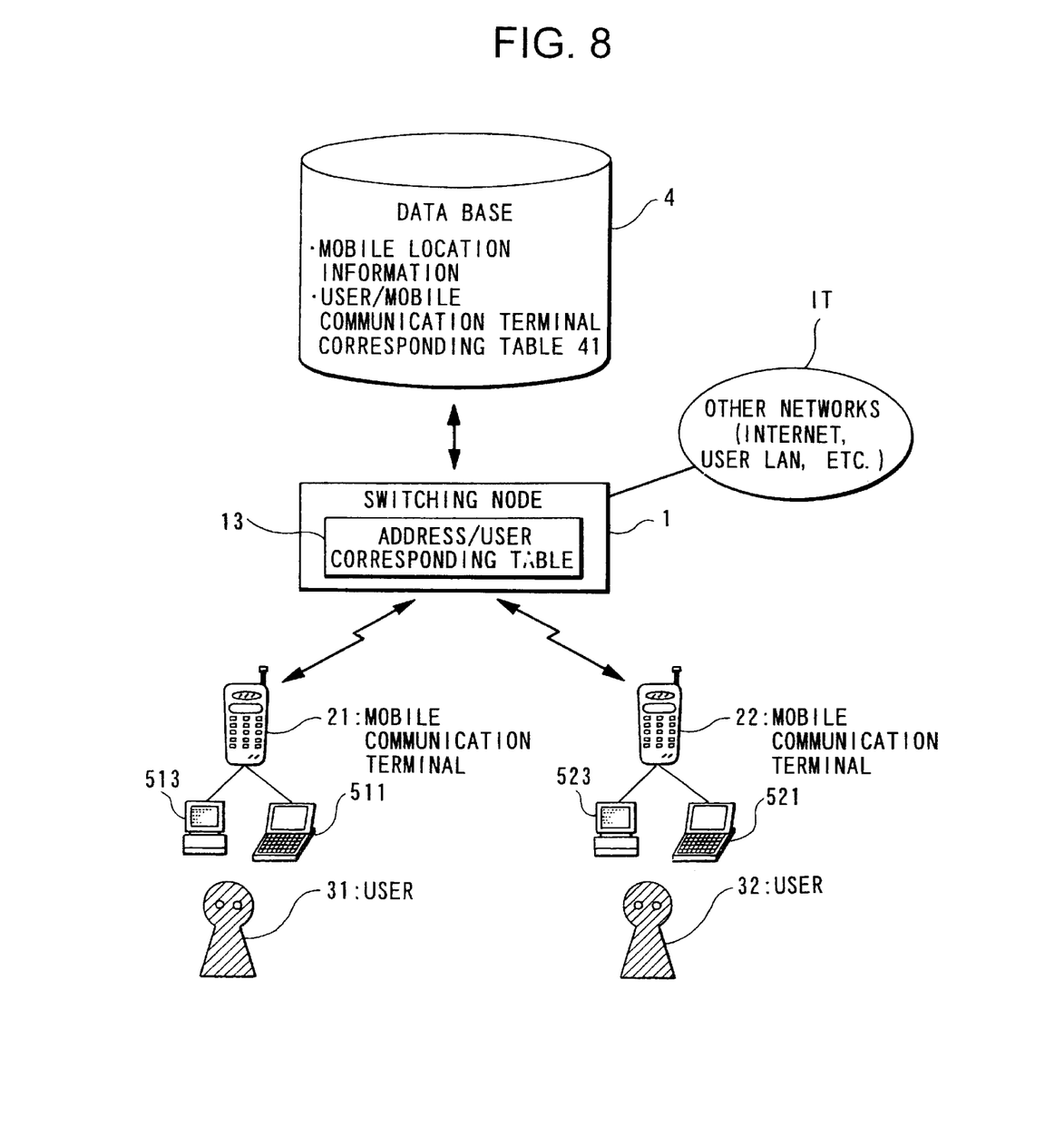
FIG. 8 is a block diagram showing a construction of a mobile communication system according to a third embodiment of the present invention.

The third embodiment, in which the present invention is applied to a mobile communications network, will now be described. FIG. 8 is a block diagram showing a construction of a communication system according to this third embodiment. In FIG. 8, corresponding parts to those of the construction of FIG. 1 or 5 are denoted by identical reference numeral of FIG. 1 and description of those parts is, therefore, omitted.

In FIG. 8, reference numeral 511, 513, 521 and 523 denote data terminals having their own addresses. The data terminals 511 and 521 are connected respectively to the mobile communication terminals 21 and 22 and perform a data communication through the same communication method. Similarly, the remaining data terminals 513 and 523 are connected respectively to the mobile communication terminals 21 and 22 and perform a data communication through a different communication method from that of the data terminals 511 and 521.

That is, FIG. 8 shows a state that the user 31 performs a data communication using the mobile communication terminal 21 and the data terminal 511 or 513, and that the other user 32 performs a data communication using the mobile communication terminal 22 and the data terminal 521 or 523.

Figure 9:
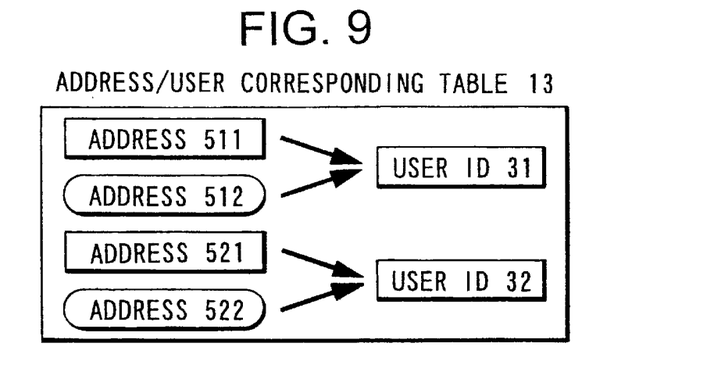
FIG. 9 is a block diagram showing a functional construction of an address/user corresponding table usable in the embodiment of FIG. 8.

The switching node 1 has an address/user corresponding table 13, as shown in FIG. 9, in the place of the address/user corresponding table 11 in the first embodiment. The address/user corresponding table 13 is different from the address/user corresponding table 11 in the respect that a plurality of addresses to be used in the different communication methods are brought into a corresponding relation with a single user ID.

Figure 10:
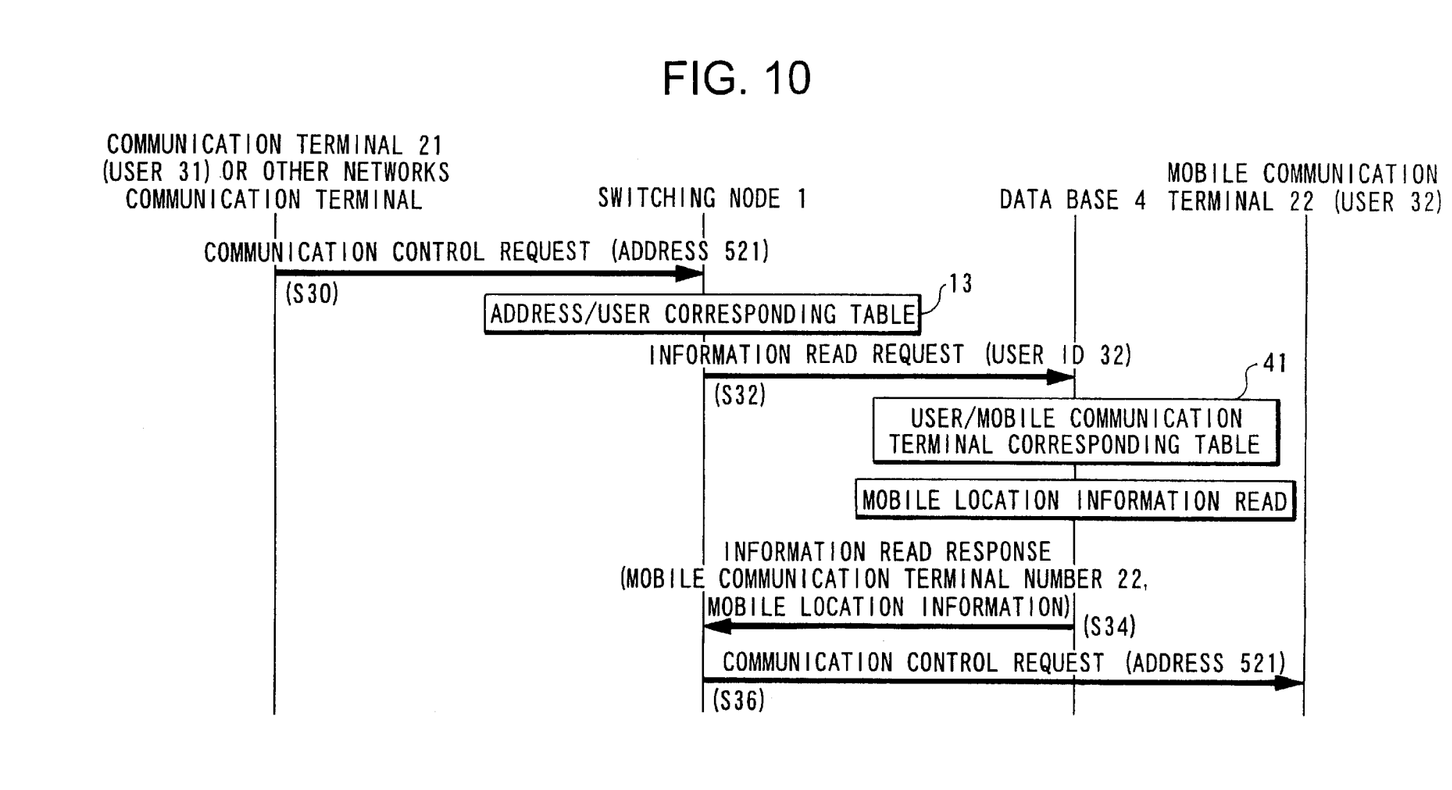
FIG. 10 is a sequence diagram showing the mobile communication system according to the embodiment of FIG. 8.

Operation of the communication system in this third embodiment will now be described. FIG. 10 is a diagram showing a sequence of such communication control procedures. In this example, an incoming data item is terminated in a data terminal 521 connected to the mobile communication terminal 22. In this case, the mobile communication terminal 21 or one of the terminals in other networks, as a requesting end, sends a communication control request to the switching node 1 using the address of the data terminal 521 which is assigned to the user 32 as the other party of the communication (S30).

Upon receipt of such a communication control request as just mentioned, the switching node 1 obtains a user ID from the address contained in the communication control request using the address/user corresponding table 13. The switching node 1, which obtained the user ID, sends an information read request containing the user ID to the data base 4 (S32).

Upon receipt of the information read request, the data base 4 obtains the mobile communication terminal number corresponding to the user ID contained in the information read request using the user/mobile communication terminal corresponding table 41. Then, the data base 4 reads a mobile location information of the mobile communication terminal and transmits an information read response containing the mobile communication terminal number and the mobile location information to the switching node 1 (S34).

Upon receipt of the information read response, the switching node 1 performs a terminating control with respect to the mobile communication terminal 22 located in the area indicated by the mobile location information contained in the information read response and indicated by the mobile communication terminal number contained in the information read response (S36).

According to this third embodiment, even if a user, who performs a communication through multiple communication methods, changes the current mobile communication terminal to another, the terminating ends in all the multiple communication methods can be changed merely by rewriting the user/mobile communication terminal corresponding table 41.

(Fourth Embodiment)

Figure 11:
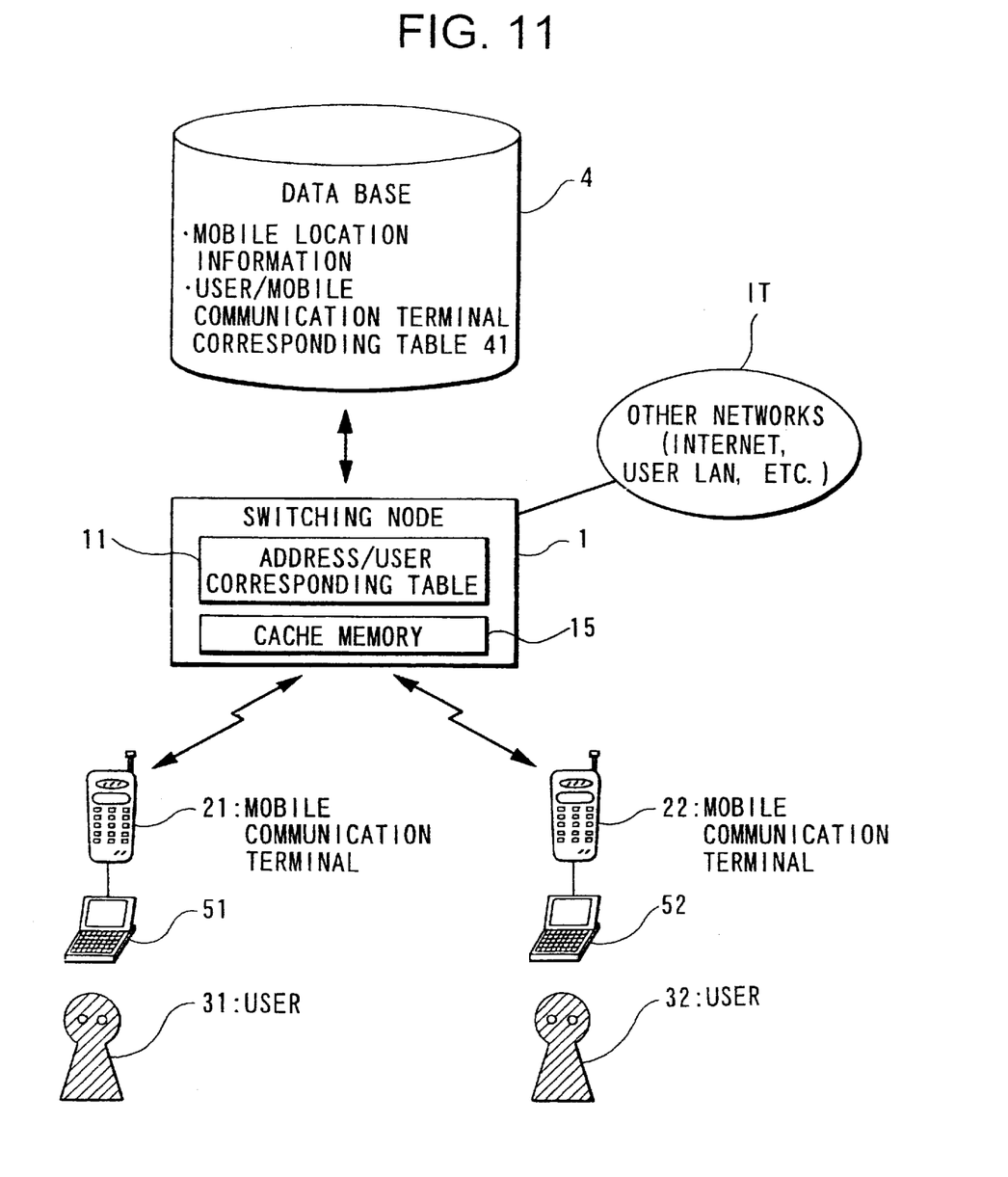
FIG. 11 is a block diagram showing a construction of a mobile communication system according to a fourth embodiment of the present invention.

The fourth embodiment, in which the present invention is applied to a mobile communications network, will now be described. FIG. 11 is a block diagram showing a construction of a communication system according to this fourth embodiment. In FIG. 11 corresponding parts to those of the construction of FIG. 1, 5 or 8 are denoted by identical reference numeral of FIG. 1 and description of those parts is, therefore, omitted.

A switching node 1 of FIG. 11 is different from the switching node 1 of FIG. 1 as well as others in the respect that the former has a cache memory 15. This cache memory 15 can temporarily store therein a corresponding relation between the addresses and the users and between the users and the mobile communication terminals, the mobile location information of the mobile communication terminals, etc.

The cache memory 15 is required to have a quicker accessing speed than the HDD, etc. constituting the various tables. Therefore, as far as this condition is satisfied, an arrangement having buffer area assigned to a main memory within the switching node 1 may be used in the place of the cache memory.

Figure 12:
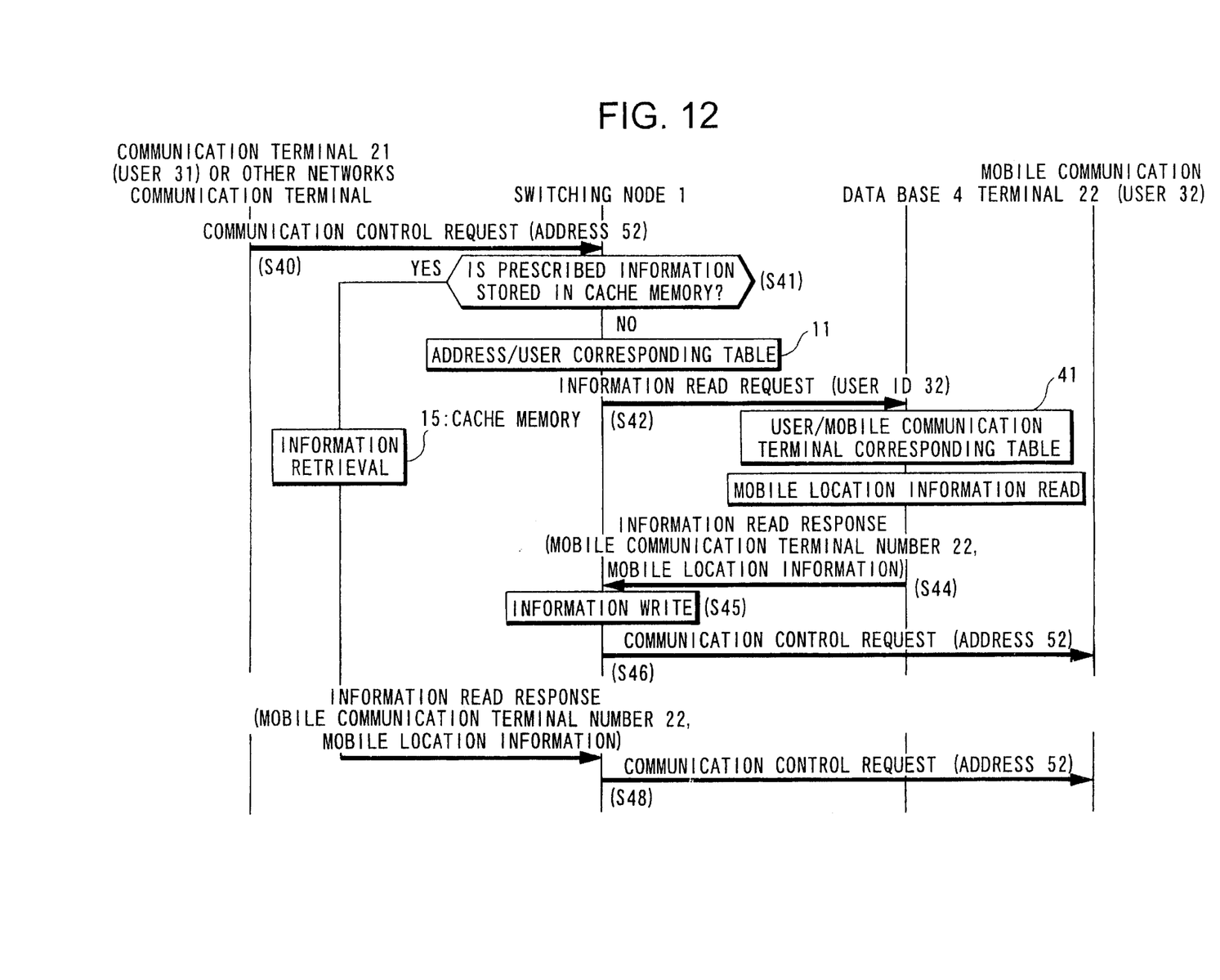
FIG. 12 is a sequence diagram showing a control sequence of the mobile communication system according to the embodiment of FIG. 11.

Operation of the communication system in this fourth embodiment will now be described. FIG. 12 is a diagram showing a sequence of such communication control procedures. The sequence diagram of FIG. 12 is based on the construction shown in FIG. 11. In this example, a communication request is made with respect to a data terminal 52 connected to the mobile communication terminal 22, that is, an incoming packet data item addressed to the data terminal 52 is received. In this case, since the mobile location of the mobile communication terminal 22 is within the area which is under the supervision of the switching node 1 as shown in FIG. 11, the mobile location information of the mobile communication terminal 22 managed in the data base 4 indicates to that effect. Since it is customary in the mobile communication that various data items are transmitted in the form of a packet, the data items addressed to the data terminal 52 are packeted and transmitted one after another.

First, the mobile communication terminal 21 or one of the terminals in other networks, as a requesting end, sends a communication control request to the switching node 1 using the address of the data terminal 52 which is assigned to the user 32 as the other party of the communication (S40).

Upon receipt of such a communication control request as just mentioned, the cache memory 15 judges whether or not the data corresponding to the above address are stored (S41). At the time point when the communication control request is received, such data are not stored in the cache memory 15. Therefore, the switching node 1 obtains a user ID from the address contained in the communication control request using the address/user corresponding table 11. The switching node 1, which obtained the user ID, sends an information read request containing the user ID to the data base 4 (S42).

Upon receipt of the information read request, the data base 4 obtains the mobile communication terminal number corresponding to the user ID contained in the information read request using the user/mobile communication terminal corresponding table 41. Then, the data base 4 reads a mobile location information of the mobile communication terminal and transmits an information read response containing the mobile communication terminal number and the mobile location information to the switching node 1 (S44).

Upon receipt of the information read response, the switching node 1 writes the information read response on the cache memory 15 in such a manner as to correspond to the address of the data terminal to which the terminating request is made(S45). Then, the switching node 1 performs a terminating control with respect to the mobile communication terminal 22 located in the area indicated by the mobile location information contained in the information read response and indicated by the mobile communication terminal number contained in the information read response (S46).

By executing the above sequence of procedures, the first data addressed to the data terminal 52 are transmitted through the mobile communication terminal 22. Since it is customary in the mobile communication that various data are transmitted in the form of a packet as previously mentioned, thereafter, data addressed to the data terminal 52 are packeted and transmitted one after another from the same terminal. In this way, in case a plurality of packets are transmitted, a control sequence for transmitting the second packet downward will now be described.

When the second packet is transmitted to the switching node 1, the switching node 1 judges, as in the case with the procedures in S41, whether or not the data corresponding to the address of the data terminal 52 are stored. Since these data are written on the cache memory 15 in S45, it is judged as "YES" here.

Then, the switching node 1 reads data corresponding to the address of the data terminal 52, that is, an information read response relating to the mobile communication terminal 22, from the cache memory 15 and performs a terminating control with respect to the mobile communication terminal 22 located in the area indicated by the mobile zone information contained in the information read response (S48).

Here, since the data base 4 is connected to the switching node 1 through a communication line, data transmission speed is limited. On the other hand, since the cache memory 15 is located within the switching node 1, a high speed access can be made with respect to the cache memory 15. Moreover, since data are temporarily stored in the cache memory 15, the amount of data stored in the cache memory 15 are extremely smaller than that in the data base 4. Accordingly, the time required for retrieving a data item is short. As a consequence, the switching node 1 can very rapidly obtain the information of the terminating end with respect to the second packet downward.

Therefore, according to the fourth embodiment, even if the user changes the current mobile communication terminal to another, the terminating end can be changed merely by rewriting the user/mobile communication terminal corresponding table 41 and data can be transmitted to the mobile communication terminal 32 at an extremely high speed. Moreover, in case data are read from the cache memory 15, since it is unnecessary to access the data base 4, loads to be incurred to the data base 4 can be reduced.

In the fourth embodiment, since the information to be read from the cache memory is the mobile communication terminal number and the mobile location information of the connecting end, a parameter to be given to the cache memory is set as the address of the counter part of the connecting end. That is, data about the corresponding procedures performed in the address/user corresponding table and in the user/mobile communication terminal corresponding table are temporarily stored (cashing) in the cache as one group. However, this embodiment is not limited to this example. Instead, it may be arranged such that information about only the corresponding procedures to be performed in the user/mobile communication terminal corresponding data is temporarily stored (cashing) in the cache memory. Even with this construction, if that data item or information is stored in the cache memory, an access to the data base 4 can be omitted. Thus, the time required for obtaining the information read response can be reduced.

(Others)

The present invention is not limited to the above embodiments. For example, in the first embodiment through the fourth embodiment, the switching node 1 includes the address/user corresponding table, and the data base 4 includes the user/mobile communication terminal corresponding data. In the alternative, selected one of the switching node 1 and the data base 4 may include both the address/user corresponding table and the user/mobile communication terminal corresponding table.

As described hereinbefore, according to a mobile communications network and a mobile communication method according to the present invention, by changing a mobile communication terminal corresponding to a certain user in the user/mobile communication terminal corresponding table, the terminating ends of all addresses with respect to that user can be changed. Accordingly, even if the user changes the current mobile communication terminal to another, it is unnecessary to correct the address/mobile communication terminal corresponding table with respect to the addresses to be used in each communication method.

As a consequence, an amount of correction to be performed within the communications network which correction is necessitated because the user changes its terminal, can be reduced and loads to be incurred to the mobile communications network can be reduced, too.

What is claimed is:

1. A mobile communications network for performing a communication using a mobile communication terminal number assigned to each mobile communication terminal and a user ID assigned to a user of the mobile communication terminal, comprising:

(a) address/user corresponding means for bringing an address, which the user uses for performing a communication through the communications network and the user ID into a corresponding relation;

(b) user/mobile communication terminal corresponding means for bringing the user ID and the mobile communication terminal number into a corresponding relation;

(c) first communication means for storing a mobile location area of each mobile communication terminal;

(d) means for obtaining a user ID corresponding to a specified address when a terminating request specifying an address is made using said address/user corresponding means;

(e) retrieval means for retrieving a mobile communication terminal number corresponding to the user ID using said user/mobile communication terminal corresponding means;

(f) read means for reading a mobile location area of a mobile communication terminal specified by the retrieved mobile communication terminal number from said first storage means; and (g) termination means for terminating in the specified mobile communication terminal using the retrieved mobile communication terminal number and the mobile location area thus read.

2. A mobile communications network according to claim 1, wherein said address/user corresponding means includes means for bringing a plurality of addresses and a user ID into multiple-to-one corresponding relation.

3. A mobile communications network according to claim 1 or 2, wherein said communications network has a multiple communication methods, and said address/user corresponding means includes means for bringing addresses used in each of said multiple communication methods and a user ID into multiple-to-one corresponding relation.

4. A mobile communications network according to claim 1 further comprising:

second storage means for writing the mobile communication terminal number retrieved using said user/mobile communication terminal corresponding means and the mobile location area read from said first storage means in such a manner as to correspond to the specified address when a terminating request specifying a certain address is made for the first time, when a terminating request specifying the same address again, said terminating means reading the mobile communication terminal number corresponding to the specified address and the mobile location area from said second storage means and terminating the incoming signal to be terminated in the specified mobile communication terminal.

5. A mobile communication method in a communications network in which a mobile communication terminal number is assigned to each mobile communication terminal, a user ID is assigned to a user of the mobile communication terminal, and at least one address is preliminarily determined which address is used when the user performs a communication in the communications network, and in which said addresses to be used in each of multiple communication methods and the user ID are preliminarily stored in an address/user corresponding means in multiple-to-one corresponding relation, and the user ID and the mobile communication terminal number are preliminarily stored in user mobile communication terminal corresponding means, and when a terminating request is made specifying the address, said mobile communication method comprising the steps of:

(A) obtaining the user ID corresponding to the specified address using said address/user corresponding means;

(B) retrieving a mobile communication terminal number corresponding to the obtained user ID using said user/mobile communication terminal corresponding means;

(C) reading a mobile location of the mobile communication terminal corresponding to the user ID from storage means for storing mobile location areas of various mobile communication terminals; and (D) terminating the incoming signal in the specified mobile communication terminal using the retrieved mobile communication terminal number and the read-out mobile zone area.

\* \* \* \* \*